June 7, 1960 G. T. CARTEN 2,939,360
BRAID ANCHORAGE STAND
Filed Aug. 4, 1958
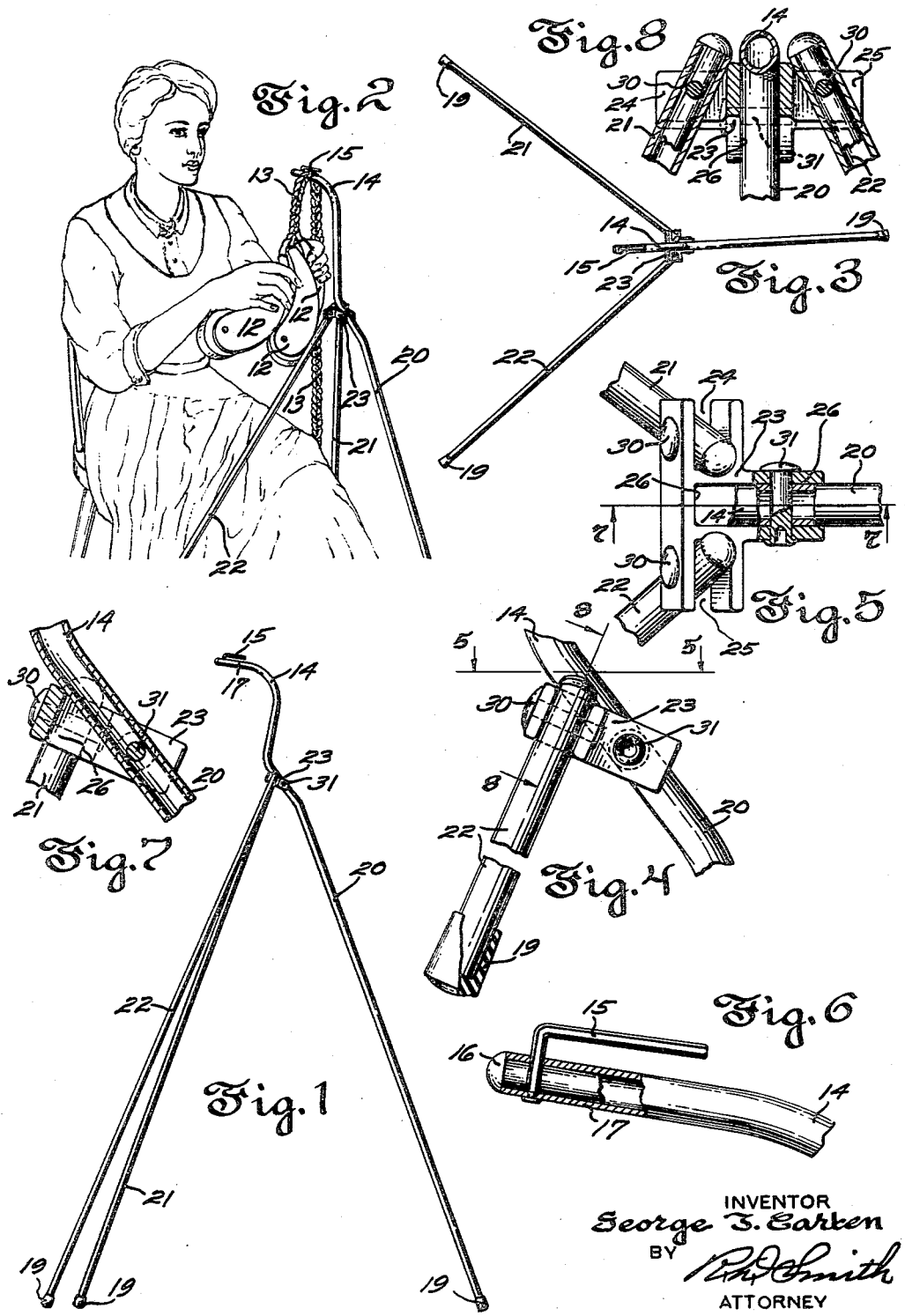
INVENTOR
George T. Carten
BY
ATTORNEY

United States Patent Office 2,939,360
Patented June 7, 1960

2,939,360

BRAID ANCHORAGE STAND

George T. Carten, Milford, Conn., assignor to Carten Redi-Braid, Incorporated, Devon, Conn., a corporation of Connecticut Filed Aug. 4, 1958, Ser. No. 752,854

6 Claims. (Cl. 87—62)

This invention relates to a collapsible portable stand particularly fashioned to serve as a holding anchorage for the completed length of a hand braided strip while the hand braiding of the strip progresses in preparation for use of the strip, say, in making a braided rug.

Such hand braiding process as heretofore commonly carried out in the home tends to be cumbersome and disagreeable owing to crude means that have been employed for holding the newly braided strip as the braiding progresses to completion. It has been a common practice to anchor the braided length of the strip to a nail driven into a window sill or by attaching it to a wall hook. Such expedients require the operator, while braiding, to face the window or some other sight obscuring structure which has made the process of rug braiding monotonous and less attractive than could otherwise be the case.

An object of this invention is to provide an easily maneuvered floor stand adapted firmly to hold the newly completed length of a braided strip and which can be stationed in, or removed to, any desired location in a room.

Another object is to provide such stand in light skeleton form enabling the operator to sit before it and at the same time watch television or converse with other members of the household while braiding. This is feasible because the braiding process itself does not require the exclusive attention of an experienced operator.

Another object it to equip a stand as aforesaid with very lightweight collapsible legs that are swingably adjustable in the manner of a tripod for disposing the braid engaged head of the stand in whatever position is most convenient for the operator while seated at the stand.

A further object is so to construct a braid anchoring stand that the knees of an operator seated close to the stand are accommodated commodiously between and straddled by the legs of the stand.

A further object is to equip the stand with a work holding head in the form of a rigid gooseneck affording a braid anchoring terminal located in offset relation to the vertex of a pyramidal arrangement of the legs of the stand.

These and other objects of the invention will become clear in further particular from the following described example of a practical embodiment of the improvements, the description having reference to the appended drawings wherein:

Fig. 1 is an elevation of my improved stand as set up ready for use with its legs spread apart and resting stably on a floor.

Fig. 2 is a fragmentary view of the upper portion of the stand as used by an operator seated at the stand.

Fig. 3 is a plan view of the stand.

Fig. 4 is a fragmentary elevation of the hinge construction of the legs of the stand drawn on an enlarged scale.

Fig. 5 is a plan view of the hinge construction taken in section on the plane 5—5 in Fig. 4.

Fig. 6 is a view of the braid anchoring terminal portion of the gooseneck of the stand partly broken away to expose details of the construction.

Fig. 7 is a view taken in section on the plane 7—7 in Fig. 5, looking in the direction of the arrows.

Fig. 8 is a view taken in section on the plane 8—8 in Fig. 4, looking in the direction of the arrows.

In Fig. 2 the operator is shown performing a braiding process with the use of three loaded shuttles of the kind pictured and described in my United States Patent No. 2,831,389, issued April 22, 1958. These shuttles together with a length of a strip 13 whose braiding has been completed are shown to dangle from a rigid gooseneck 14 in front of which the operator sits. The finished length of the braid is looped crosswise over the top surface of the free ended portion 17 of a rigid gooseneck or anchorage extension 14 and is wedged between the same and an elongate hook 15 fixedly mounted on the gooseneck as shown in Fig. 6. Hook 15 is preferably a small rod of metal that is flat-sided or hexagonal in cross section to snugly fit a correspondingly shaped hole in the tubular wall of the gooseneck through which the mounted end of hook 15 extends. This prevents swiveling of the hook and keeps it fixedly aligned so that the gooseneck points backward in a direction away from the operator. Hook 15 is fastened firmly by having its mounting end reduced to form a shoulder, the reduced end projecting through a close-fitting hole in the opposite tubular wall of the gooseneck against which it is swaged or peened over. The open end of the tubular gooseneck 14 may be filled for appearance by a round headed plug 16 to prevent catching of the work on sharp edges of the tubular wall.

Gooseneck 14 as herein shown is an integral upstanding anchorage extension of a tubular stand leg 20 of sigmoidal curvature which causes the work holding end 17 of the gooseneck to be offset forward toward the operator from the vertex or junction point of a pyramidal arrangement of the legs of the stand which form at least a three point support. Fig. 3 shows that the work holding end 17 of the gooseneck or anchorage extension occupies a position above an area of floor space bordered by a vertical downward projection of legs 21 and 22. These two side legs 21 and 22 of the stand are alike. All three of the legs shown in the drawing are joined by their swingably coupled relation to a single hinge block 23.

Block 23 is shaped to provide three channels 24, 25 and 26 which accommodate and confine to predetermined planes the respective swinging movements of the three legs 21, 22 and 20, respectively. Legs 21 and 22 terminate immediately above their respective channels and each is pivotally connected to the hinge block 23 by a cross pin 30. Rear leg 20 is pivotally connected to the hinge block by a cross pin 31. Fig. 7 makes clear that counterclockwise swinging of the leg 20 in relation to hinge block 23 is limited by abutment of a short extension of the leg against the hinge block at the dead end of channel 26. In like manner the swinging movement of legs 21 and 22 in relatively separating directions is limited by the abutment of short extensions of each of these legs against the dead ends of channels 24 and 25 respectively, as shown in Fig. 8.

For carrying about or storing the improved stand it may be instantly collapsed by swinging its legs into close parallelism. The legs are easily spread into their relative positions shown in the drawings when the stand is to be set up for use. The non skid floor grabbing shoes 19 on the floor ends of the legs enable the stand to remain tilted stably at the choice of the user in tripod style while a vertically plumb position of the stand, as shown in the drawings, will result from spreading all of the legs to the limit of their relative swinging movements as predetermined by abutment of the legs against the hinge block 23 at the dead ends of the block channels 24, 25 and 26. See Figs. 7 and 8.

An advantageous size of structure will result from making the legs from aluminum tubing approximately ⅜″ in outside diameter. Legs 21 and 22 may conveniently be made 42" long from foot to hinge joint while leg 20 from foot to hinge joint may measure 39½" to effect convenient inclination of the stand when used as shown in Fig. 2. It is found that a slightly tapering space of approximately 3/16" height works well for securely and easily anchoring the braid under a brass hook 15 which suitably may be 1½" long.

The appended claims are directed to and intended to cover all variations and equivalents for the precise shapes and arrangement of parts herein disclosed that fall within the principles of construction defined in the claims.

I claim:

1. A stand for holding newly formed braid during continued carrying on of the braiding process comprising, a pyramidal group of three relatively swingable legs, a hinge block at the junction of said group of legs to which block each of said legs is pivotally coupled, one of said legs having an anchorage extension reaching upward past said hinge block, and a braid catching and holding device carried on said extension disposed to anchor and support a length of newly formed braid.

2. A stand as defined in claim 1, in which the said anchorage extension is of sigmoidal shape in its length above the said hinge block.

3. A stand as defined in claim 1, in which the said anchorage extension of said one leg has a terminal portion carrying the said device in a position located over the area of floor space bordered by a vertical downward projection of the said other two legs.

4. A stand as defined in claim 3, in which the said braid catching and holding device comprises a hook fixed on the said anchorage extension pointing backward there along toward the said one of the said legs.

5. A stand as defined in claim 4, in which the said hook is located over the said floor space and points backward therefrom.

6. A stand as defined in claim 4, in which the said hook comprises a member mounted fixedly on the said terminal portion of the said anchorage extension and bent to overhang the said terminal portion of the said anchorage extension at a distance therefrom adapted to receive a braided strip in wedging relation to the space between said hook member and the adjacent surface of said extension.

References Cited in the file of this patent

UNITED STATES PATENTS

| | | |
|---|---|---|
| 332,383 | Cole et al. | Dec. 15, 1885 |
| 2,524,490 | Swett | Oct. 3, 1950 |